(12) United States Patent  (10) Patent No.: US 7,775,082 B2
Friedman et al.  (45) Date of Patent: *Aug. 17, 2010

(54) VEHICLE ROLLOVER TEST FIXTURE

(75) Inventors: Donald Friedman, Santa Barbara, CA (US); Acen Jordan, Carmel, CA (US)

(73) Assignee: Safety Testing International, Inc., Goleta, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 12/136,708

(22) Filed: Jun. 10, 2008

(65) Prior Publication Data

US 2008/0307855 A1  Dec. 18, 2008

Related U.S. Application Data

(60) Provisional application No. 60/943,355, filed on Jun. 12, 2007.

(51) Int. Cl.
G01N 3/00 (2006.01)
G01M 17/00 (2006.01)

(52) U.S. Cl. .................. 73/12.06; 73/12.13; 73/865.3

(58) Field of Classification Search ............... 73/865.3, 73/12.06, 12.09, 12.13
See application file for complete search history.

(56) References Cited

U.S. PATENT DOCUMENTS 2,115,841 A * 5/1938 Case ..................... 73/12.06

| 4,970,890 A | 11/1990 | Jaafar et al. |
| 4,980,705 A | 12/1990 | Akutsu et al. |
| 6,256,601 B1 | 7/2001 | Wipasuramonton et al. |
| 6,622,541 B2 | 9/2003 | Stein et al. |
| 6,651,482 B1 | 11/2003 | Moffatt et al. |
| 2004/0254707 A1 | 12/2004 | Lu et al. |
| 2006/0207353 A1 | 9/2006 | McCoy |
| 2006/0278026 A1 | 12/2006 | Friedman et al. |

OTHER PUBLICATIONS

Batzer, S. A., Hooker, R. M. "Dynamic Roof Crush Intrusion in Inverted Drop Testing" is International Safety Conference on the Enhanced Safety Vehicles, Paper No. 05-0146-W, Washington, D. C. Jun. 6-9, 2005.
Federal Motor Vehicle Safety Standards; Roof Crush Resistance. 49 CFR Part 571.
Friedman, K., Gaston, F., Bish, J. Experimental comparison of inverted dummy and living human drop tests. 1999 Bioengineering Conference.

* cited by examiner

*Primary Examiner*—Lisa M Caputo
*Assistant Examiner*—Punam Roy
(74) *Attorney, Agent, or Firm*—Felix L. Fischer

(57) ABSTRACT

A test fixture for rollover crash testing of a test vehicle onto a moving surface employs a cradle to support and rotate the test vehicle. A vertical support structure to position and releasably holds the cradle. A moving sled having a contact surface and is carried by a guide extending beneath the structure and the cradle fixture. The cradle is rotated and released from the structure responsive to a sensor for contact within a drop impact zone on the contact surface of the moving sled. Vertical motion of the cradle is then arrested to prevent further damage to the test vehicle or the test structure.

25 Claims, 12 Drawing Sheets

VEHICLE ROLLOVER TEST FIXTURE

REFERENCE TO RELATED APPLICATIONS

This application claims priority of U.S. Provisional Application Ser. No. 60/943,355 filed on Jun. 12, 2007 having the same title as the present application and with U.S. patent application Ser. No. 11/380,862 filed on Apr. 28, 2006 now U.S. Pat. No. 7,373,801 having the same title as the present application and common inventors.

BACKGROUND

1. Field of Invention

This invention relates to an automotive vehicle test fixture. In particular, the invention relates specifically to a fixture to conduct dynamic, repeatable, controlled destructive rollover impact tests of both full scale vehicles and representations to evaluate strength and occupant protection characteristics of the vehicle roof and other vehicle components. The invention provides precise control of initial test parameters including drop height, contact roll rate, contact roll angle, pitch angle, yaw angle, post contact freefall height, vehicle moment of inertia, roadway surface conditions including friction and impact obstructions. In addition, the invention enables the measurement of dynamic forces and orientations between vehicle and road bed and enables multiple tests to be conducted and evaluated on an isolated singular roll-by-roll basis.

2. Description of Prior Art

Rollovers have been and continue to be a significant cause of occupant fatalities and serious injuries. To date, the experiments to determine vehicle performance have been criticized as unrepeatable and, thus, inappropriate for vehicle or component design and testing and/or compliance type testing. Various other test fixtures have been developed that addresses some of these issues, but require a large infrastructure to run and do not fully control the vehicle after the first impact and during the test (reference: U.S. Pat. No. 6,651,482). Another device (reference U.S. Pat. No. 6,256,601) articulates about a pivot but does not provide a full rollover capability, nor does it provide a means to simulate a roll about the true roll axis of a vehicle. In addition, none of the other test methods allow for the direct measurement of the loads applied to the vehicle, which are important to evaluating and understanding the dynamics of a rollover event. This subject invention resolves these issues in a manner that will allow effective repeatable vehicle testing. Vehicle testing in the rollover regime is crucial to understanding interactions between the occupant and the vehicle's structures, restraints, glazing, etc. A better knowledge of these parameters will allow for improved vehicle designs and a safer vehicle fleet.

Previous testing to determine vehicle performance and vehicle to occupant interactions in rollover conditions uses various types of tests including dropping a rotating vehicle, launching a vehicle from a dolly, launching a vehicle from a ramp or otherwise tripping a vehicle to initiate a roll. The major drawback of these tests is the unrepeatable nature of the testing. While these tests will allow insight into vehicle performance, they do not allow a study of vehicle and component performance during an impact that can be exactly repeated to determine changes in vehicle structure or geometry through repeated tests. In particular, earlier test methods do not result in consistent impacts due to variations in tire to dolly or tire to road impacts before the roof structure interaction or are not controlled after the roof impacts. By controlling the vehicle both before and after the roof impacts, performance during an impact can be isolated and examined in detail.

U.S. Pat. No. 6,651,482 describes an alternate method of rollover testing. The method described in that patent is considerably different from the invention discussed herein. These differences lead to several shortcomings in the previous methodology including the inability to measure the direct forces on the roof of the vehicle, the inability to control the vehicle after the desired roof contacts, the artificial positioning of anthropomorphic crash test dummies if included, the inability of the system to directly determine the roof crush from the desired impact, the inability to evaluate damage on a per roll and/or cumulative basis.

U.S. Pat. No. 6,256,601 describes a rollover test sled designed to simulate the behavior of vehicle occupant and safety systems in a rollover accident. The method described differs significantly from the invention presented herein since the test does not provide the means to rotate a test vehicle or dummies about a roll axis. The fixture described also does not provide the means to rotate the test vehicle for the purposes to measure and evaluate vehicle structural integrity.

Prior art systems are not presently able to provide control of the vehicle in pitch and yaw at the initiation of and during test sequences.

U.S. application Ser. No. 11/380,862 entitled Vehicle Rollover Crash Test Fixture now U.S. Pat. No. 7,373,801 having common inventors with the present application provides a test fixture for repeatable dynamic vehicle rollover testing. The invention disclosed therein provides a moving sled with a contact surface simulating a roadway or other appropriate medium. A cradle to suspend a test vehicle is equipped to rotate and release the vehicle onto the contact surface to repeatably simulate a rollover condition. While coupled motion of the sled and rotation of the vehicle prior to impact provide repeatable test results with highly accurate simulation, the structural and system requirements for creating and coordinating the moving sled contact zone are complex and costly. It is therefore desirable to provide a rollover test fixture with the capabilities of the prior system but simplified to reduce cost, complexity and simulation error as well as ease of setup and safety of operating personnel.

The present invention addresses these issues and provides a simplified and improved dynamic, repeatable vehicle rollover test fixture.

SUMMARY OF THE INVENTION

A test fixture for rollover crash testing of a test vehicle incorporates a cradle to support and rotate a test vehicle. The cradle is carried by a structure to position and releasably hold the cradle. A sled having a contact surface simulating a roadway is carried on a bearing assembly extending beneath the structure and the cradle fixture. The cradle, with the supported vehicle, is rotated at a predetermined rate to simulate the initial contact velocities for a rollover event and released from the structure responsive to a sensor for contact on a drop impact zone on the contact surface. The bearing supported sled reacts to the impacting vehicle and is displaced along the bearing assembly. The vertical motion of the cradle is arrested at the event completion to avoid damage to the bearing and sled system as well as limiting further damage to the test vehicle.

BRIEF DESCRIPTION OF THE DRAWINGS

The elements and features of the invention are further described with respect to the detailed description herein and the following drawings wherein.

DETAILED DESCRIPTION OF THE INVENTION

Figure 1:
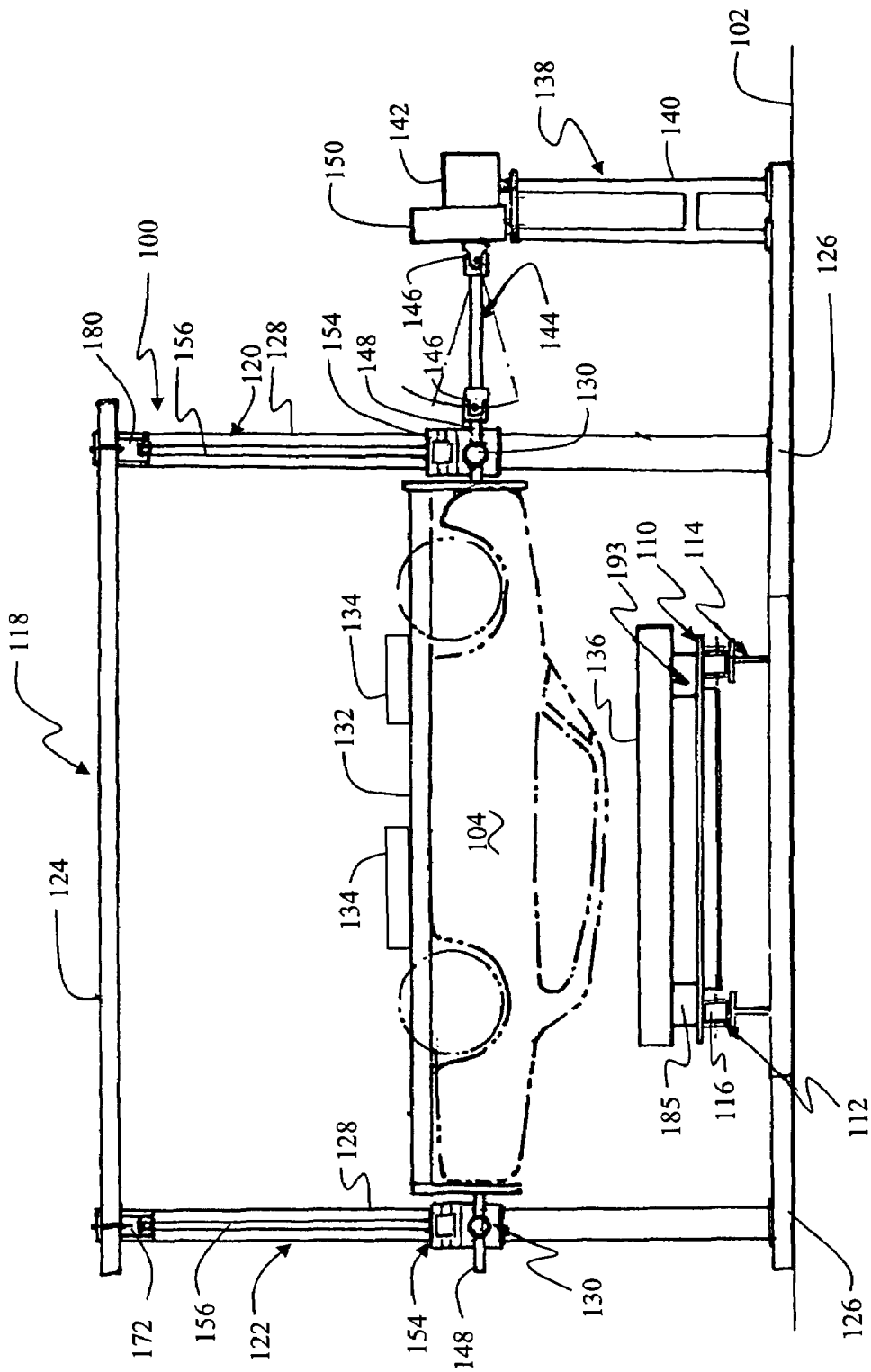
FIG. 1 is a front view of the rollover fixture showing the major components.
Figure 2:
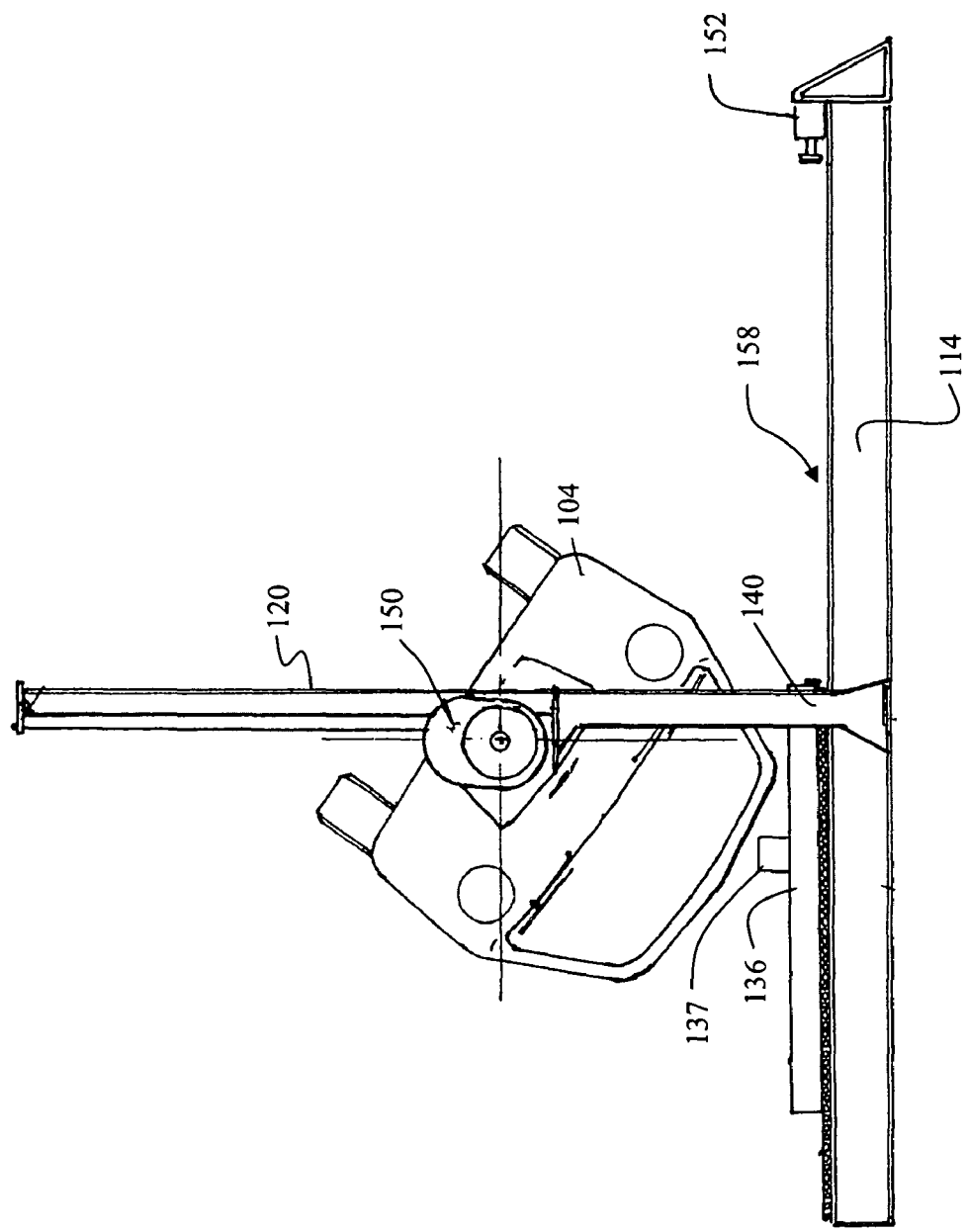
FIG. 2 is a side view of the rollover fixture of FIG. 1.

An exemplary embodiment of the structure of the present invention is illustrated in FIGS. 1 and 2. The test fixture 100 incorporates a sled 110 supported by a bearing system 112 having guide rails 114 and caged roller bearings 116 for the embodiment shown. Drop tower assembly 118 includes a front drop column 120 and a rear drop column 122 connected overhead by a cross beam 124. The drop tower assembly 118 straddles the sled guide rails 114 and the drop columns are mounted to yaw adjustment guide plates 126 that are pivotably fastened to a floor 102 of the test area. The angular orientation of the drop tower assembly relative to the sled guide rails therefore sets the yaw position of the test vehicle. The drop columns 120 and 122 each support vertical guide bearings 128. Runner assemblies 130 which support and couple to a vehicle cradle 132 ride on the guide bearings for vertical motion of the cradle. The vehicle cradle is fitted with various brackets to facilitate mounting of various models of full size test vehicles 104 or test bucks. For the exemplary cradle shown in this embodiment, the attachment of the vehicle to the cradle is accomplished by removing the bumpers of the vehicle and attaching the cradle cross members to the bumper attachment structure on the vehicle. Cradle ballast weights 134 may be also affixed to the vehicle or cradle in order to compensate or adjust the vehicle moments of inertia.

The sled is movable on the bearing system along the guide rails in reaction to the impact of the vehicle. For the embodiment shown in the drawings, a roadway surface 136 is mounted to the upward face of the sled in order to simulate a road condition for impact with the vehicle. Various road surface materials are employed to simulate various real road conditions including Macadam and concrete. In alternative embodiments, various other surface features are mounted to the sled structure such as curb elements 137 as shown in FIG. 2 for impact studies.

With the sled simulating the roadway for impact of the vehicle, rotation of the vehicle cradle establishes the simulation parameters for impact of the vertically descending vehicle with the roadway. A rotation drive assembly 138 located adjacent the front drop column provides a rotation drive motor support frame 140 that supports a rotation drive gear motor 142. A rotation drive support shaft 144 couples the rotation drive motor and the vehicle cradle. The drive support shaft incorporates universal joints 146 that provide angular alignment between the drive motor and the vehicle cradle. Slide rods 148 couple the vehicle cradle to the runner assemblies. A clutch assembly 150 connecting the gear motor to the drive support shaft allows the motor to be disengaged during the impact sequence. The sled reacts to the impact of the rotating vehicle, moving along the bearing assembly to allow the rolling motion of the vehicle to continue while remaining supported by the cradle on the vertical columns.

For the embodiment shown, a sled decelerator 152 located at the end of the sled guide rails 114 is provided to beneficially decelerate and stop the sled in a controlled manner at the end of its travel in reaction to the rotational inertia of the impacting vehicle.

At the completion of the roll-over impact event, the car body or buck is arrested to prevent damage to the support elements of the fixture or the sled or drive system through unwanted contact. To accommodate this requirement, a vertical brake assembly 154, best seen in FIG. 1, is provided as a portion of the vertical runner assembly. The vertical brake engages a rail element 156 on the drop towers on each side of fixture. For the embodiment shown in the drawings the vertical brake is a disc brake assembly acting on the rail. The brake is actuated by a sensing element. In exemplary embodiments, a contact switch 158 on the guide rail senses motion of the sled and actuates the brake. Alternatively, event completion is determined by the angle of rotation of the vehicle under test or predetermined timing and sensing of the completed event is accomplished based on the rotation angle of the support shaft elements in the vertical runner assemblies. An index pin on the slide rod which engages a micro switch upon rotation through a predetermined arc or an angular rotation sensor on the axle or the rotation drive pulley is employed as the event completion sensor.

Figure 3:
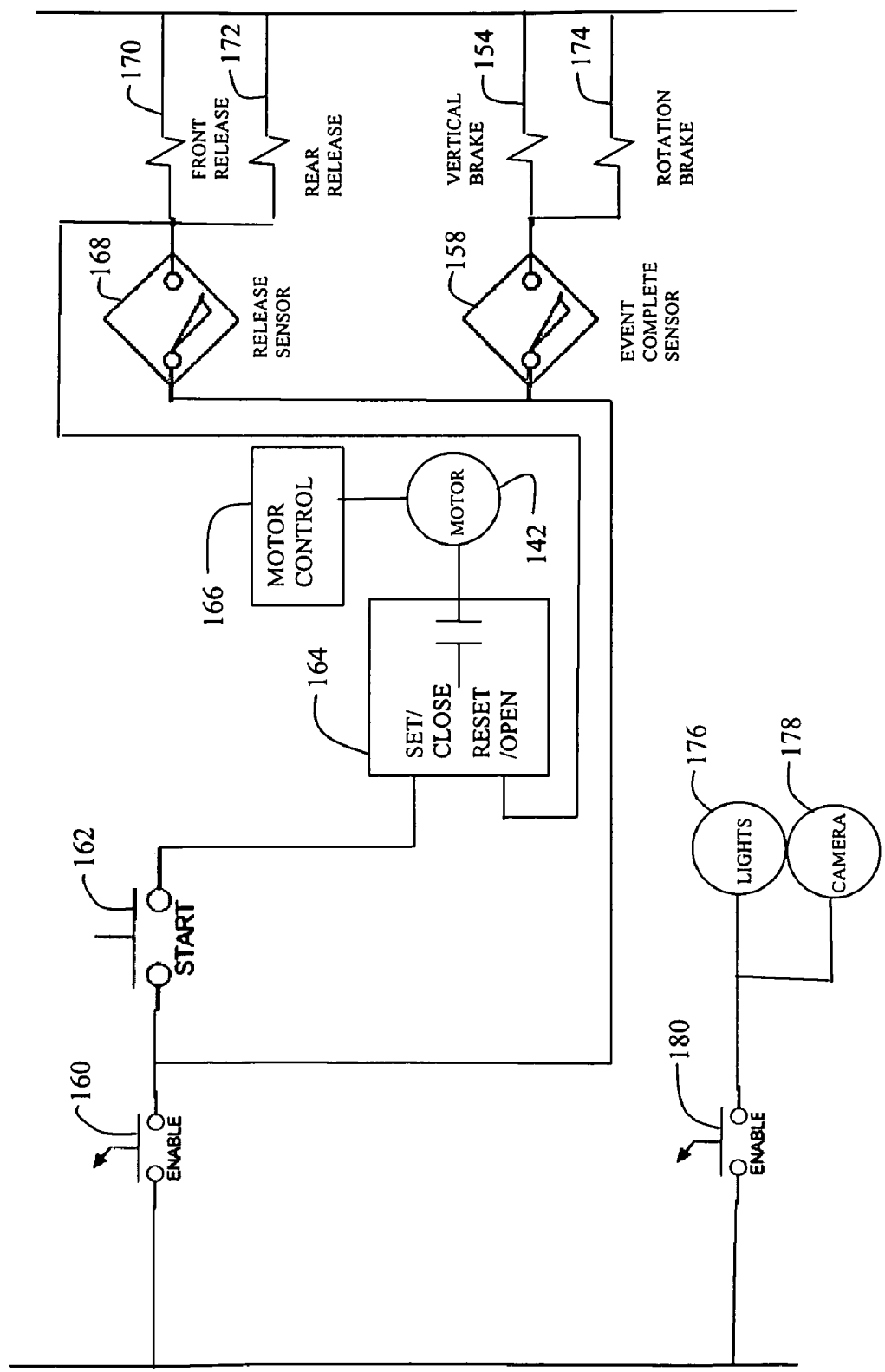
FIG. 3 diagrams an embodiment of an electrical control system used to manually start the rollover test process and to enable actuation of vehicle drop.

FIG. 3 is a diagram of a simplified electrical control system. Since human safety is paramount concern while conducting vehicle testing, system power is enabled by a keyswitch 160. A start switch 162 is manually actuated to initiate the test sequence that causes control relay 164 to close and thereby energizing the motor 142 under the control of motor control circuit 166. Upon energizing the motor control relay, rotation of the cradle is initiated. Control circuit 166 controls current to the gear motor to achieve the desired rotational velocity within a predetermined rotation angle for drop. As the cradle passes a rotation angle sensor 168, the front drop actuator 170 and rear drop actuator 172 are energized to release thereby allowing the vehicle cradle 132 and the subject test vehicle 104 it contains to drop. In the embodiment shown, power is removed from the gear motor responsive to the rotation angle sensor by resetting (opening) the motor power relay. Upon actuation of the event complete switch 158 the vertical brake assemblies 154 are activated and a rotation brake 174 is activated to stop rotation of the cradle. As shown in FIG. 3, additional test equipment features such as illumination lights 176 for cameras 178 are controlled by a switch 180 located on the operator controls.

Figure 4:
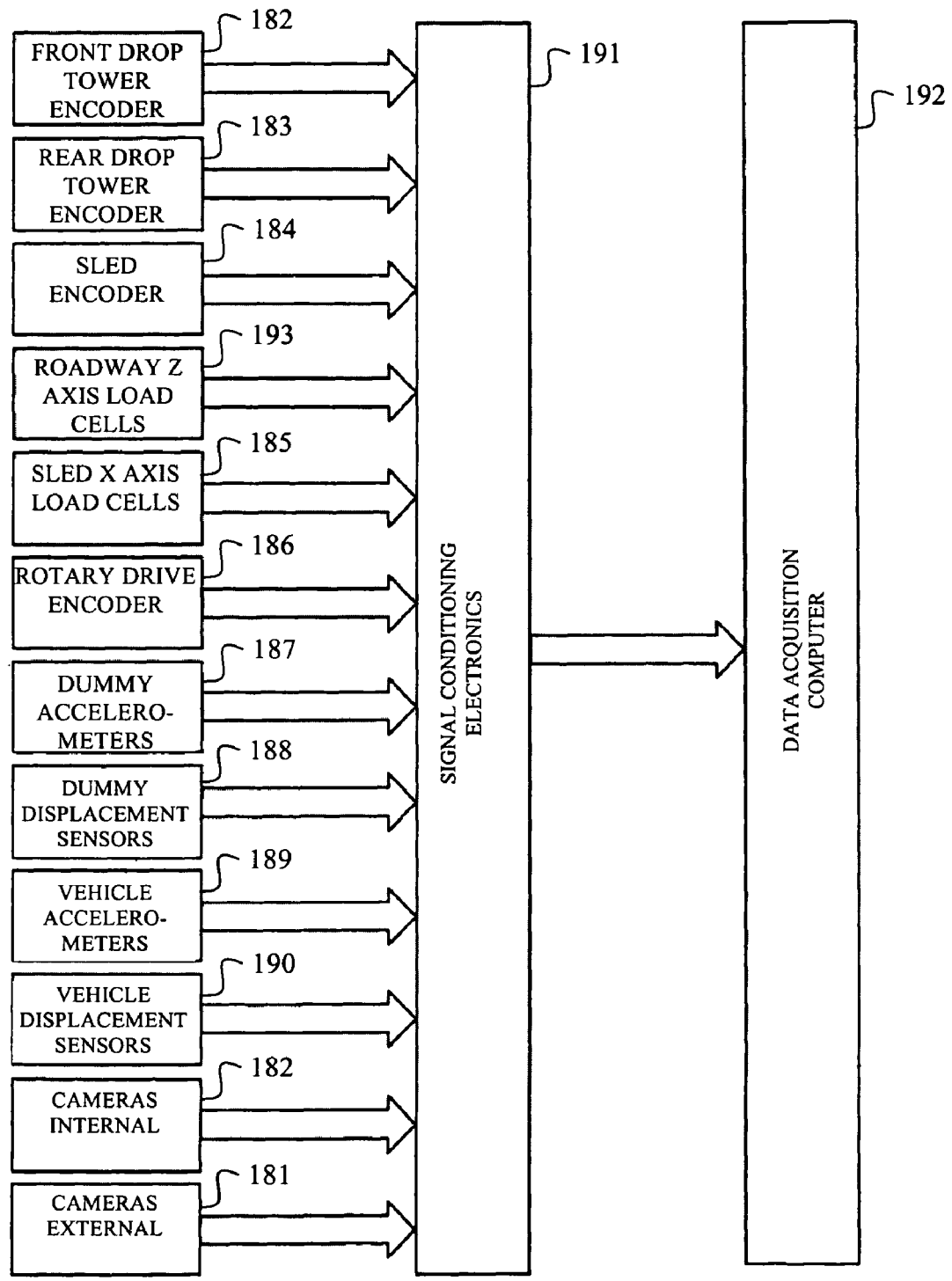
FIG. 4 diagrams an embodiment of a data acquisition system used to monitor and record dynamic physical responses of the vehicle, roadway and dummies within the vehicle.

As shown in FIG. 4, a suite of instrumentation sensors is incorporated to measure and record the dynamic physical responses of the vehicle during the test. Sensors included in a preferred embodiment of the invention are: encoders 182 and 183 respectively mounted to the front and rear drop columns 120 and 122 for recording vertical motion of the cradle and supported vehicle; encoder 184 is used to monitor the X axis linear position to derive speed and acceleration of sled 110; load cells 193 arranged between the roadway surface and the sled to monitor Z-axis impact forces imposed by the test vehicle; load cells 185 arranged between the roadway surface and the sled to monitor X-axis impact forces imposed by the test vehicle; encoder 186 to monitor the roll orientation of the test vehicle; accelerometers 187 to monitor impact forces imposed upon a test dummy; sensors 188 to monitor displacements imposed upon a test dummy during the test; accelerometers 189 to monitor impact forces imposed upon the test vehicle; sensors 190 to measure displacements imposed upon the test vehicle; cameras 182 mounted about the rollover apparatus to monitor various external aspects of the test vehicle; and cameras 183 mounted within the test vehicle to monitor various internal aspects including roof crush intrusion and dummy positions during the test.

As shown in FIG. 4, the suite of sensors as previously described are preferentially input to signal conditioning electronics 191 and digitized for input to a data acquisition computer 192. Once digitized, the collected data is saved, analyzed and formatted for various studies and reports.

Figure 5:
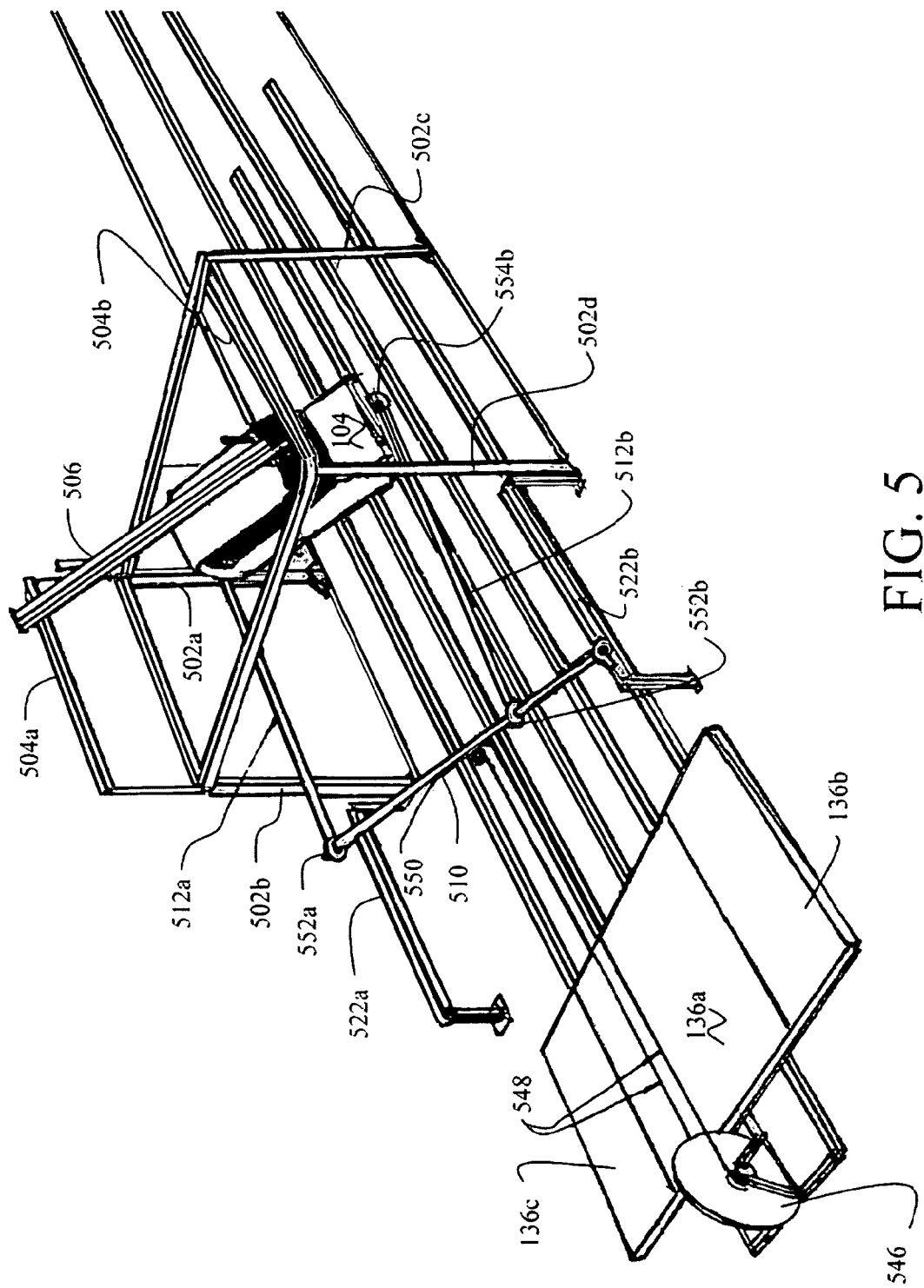
FIG. 5 is a front isometric view of an alternative embodiment of the invention with a four post support structure.

An alternative embodiment of the present invention which employs an four post structural support arrangement for simplified operation of the system in positioning the vehicle for pitch and yaw control in the test is shown in FIG. 5 and with structural details of an exemplary embodiment in FIGS. 6A-7C. A four post structure having vertical supports 502a-502d on which horizontal support beams 504a and 504b are mounted provides flexibility in positioning a suspension beam 506 from which the test vehicle 104 is suspended with a cradle 508 as will be described in greater detail with respect to FIGS. 6A-6C. By adjusting the elevation of the vertical supports, the horizontal support beams provide an angled mounting of the suspension beam to create a desired pitch angle of the vehicle mounted in the cradle. Additionally, movement of the suspension beam mounting along the horizontal support beams creates an adjustable yaw angle for the vehicle. A control beam 510 with opposing control arms 512a and 512b extending for engagement of the cradle maintain the yaw angle of the cradle and supported vehicle during the drop as will be described in greater detail with respect to FIGS. 7A-7C.

Figure 6A:
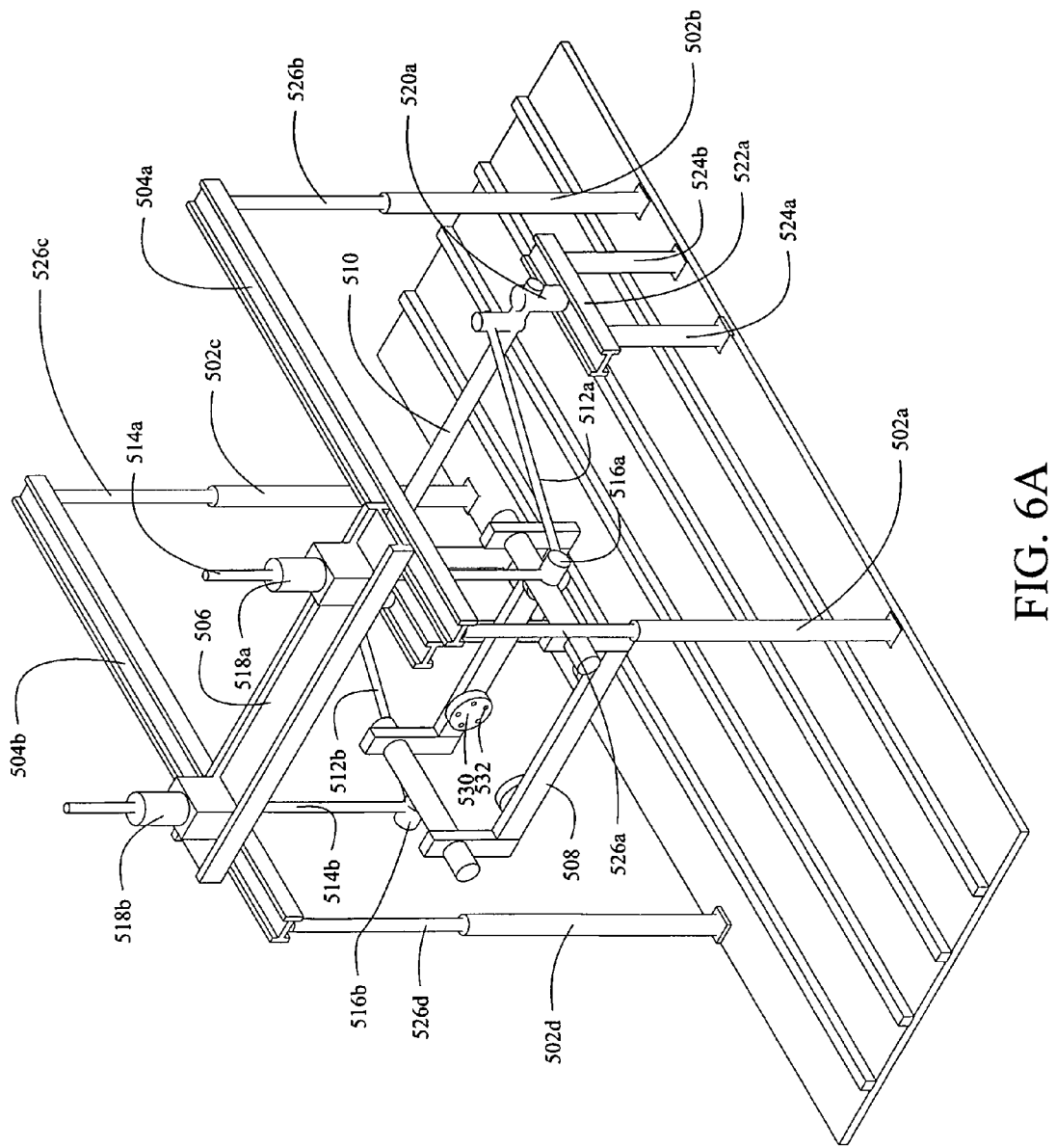
FIG. 6A is an isometric view of structural details of an implementation of the alternative embodiment in a squared orientation.
Figure 6B:
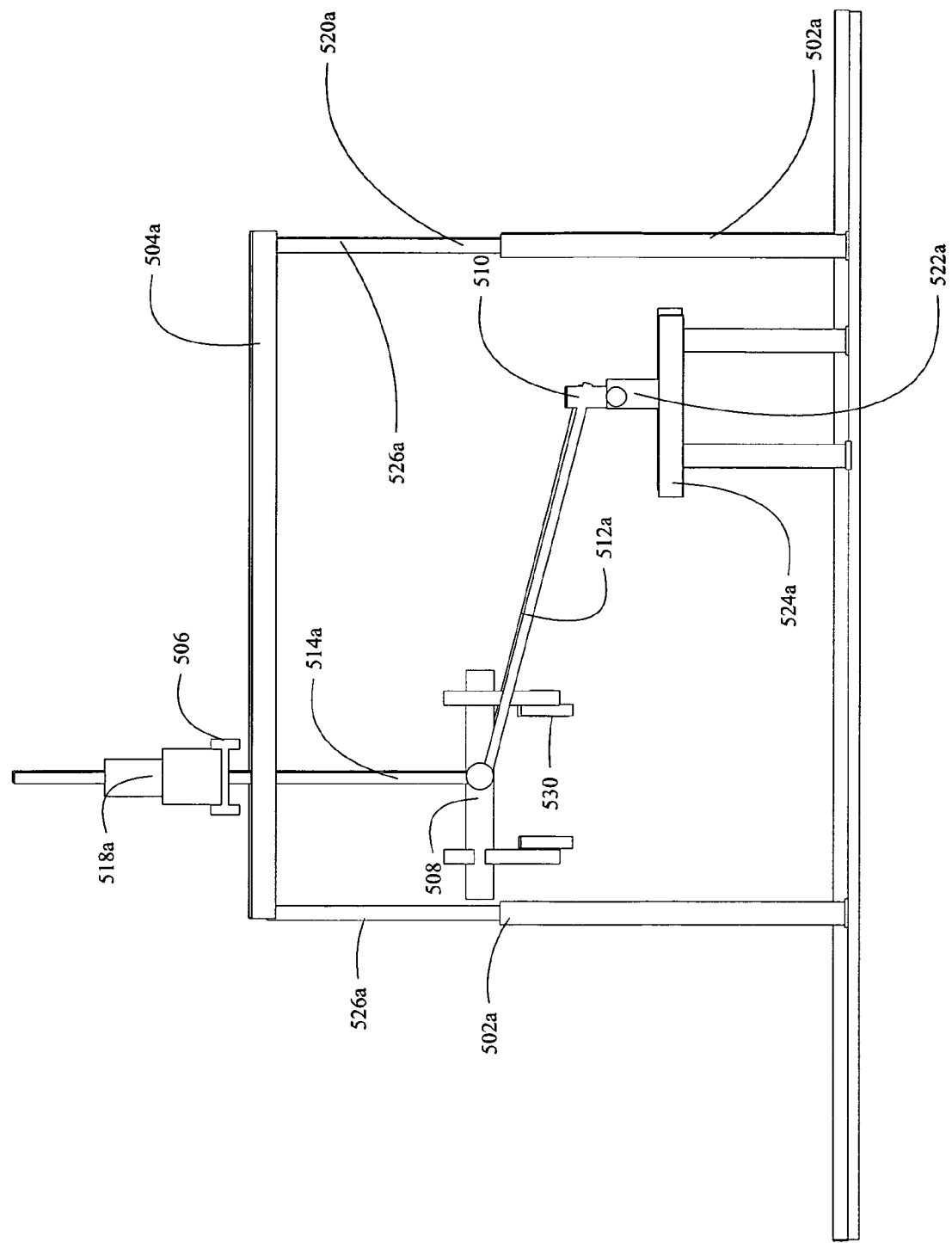
FIG. 6B is a side view of the structure of FIG. 6A.
Figure 6C:
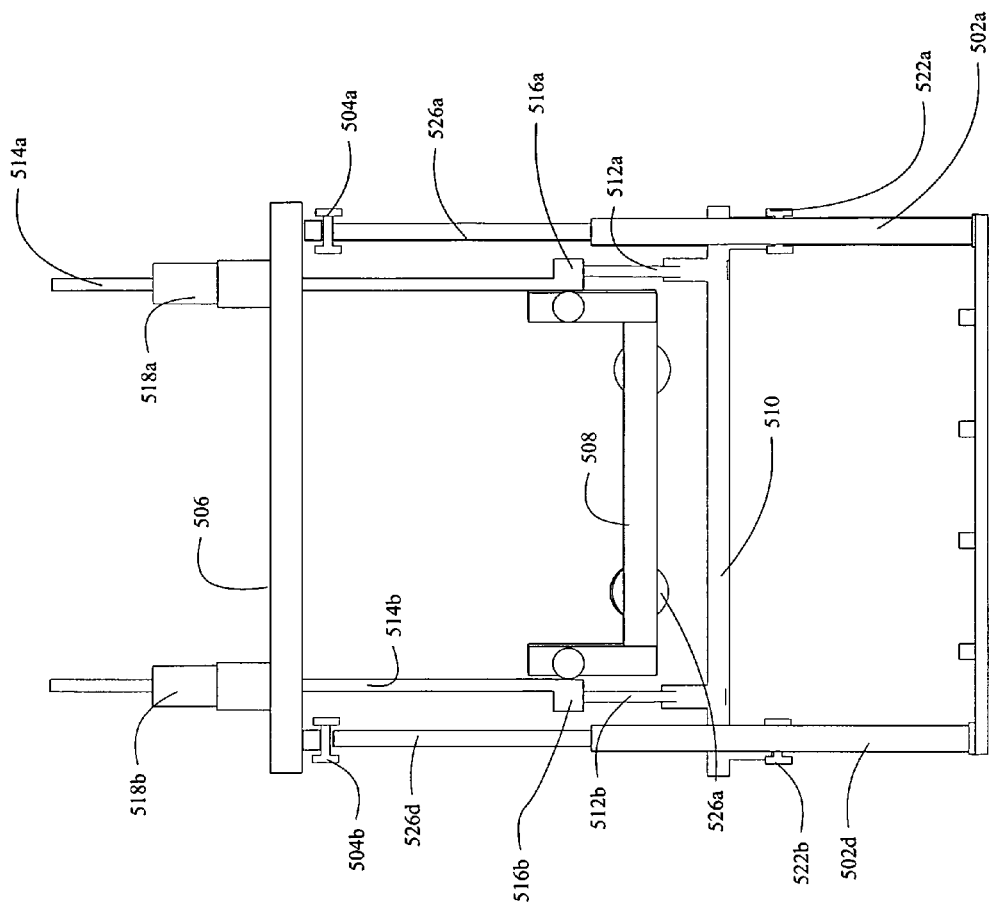
FIG. 6C is an end view of the structure of FIG. 6A.

A detailed implementation of the structure of FIG. 5 is shown in FIGS. 6A-6C. Vehicle cradle 508 is suspended from suspension beam 506 with drop rods 514a and 514b which are attached to rotational support bosses 516a and 516b at opposite ends of the cradle. The cradle rotates between the support bosses for positioning of the vehicle and inducing the angular rotation of the vehicle for the appropriate test protocol as previously described. The drop rods extend through slip bearings in actuation assemblies 518a and 518b which function in a manner similar to guide bearings on the drop columns as described with respect to the first embodiment. The actuation assemblies additionally include a brake to capture the drop rods for vertical capture of the cradle and vehicle at the conclusion of the test to arrest further vertical motion as previously described.

Control beam 510 is carried by structural supports 520a and 520b which are in turn carried on horizontal beam elements 522a and 522b. For the embodiment shown, the horizontal beam elements are attached to secondary vertical supports 524a, 524b, 524c and 524d. Structural supports 520a and 520b are movably positionable on the horizontal beam elements to allow angular positioning of the control beam to match the yaw angle of the suspension beam thereby maintaining the geometric relationship of the control arms with respect to the vehicle cradle for control of lateral motion during the vehicle drop and arrest.

For the embodiment shown, vertical supports 502a-d incorporate telescoping adjustment elements 526a-526d for vertical adjustment of horizontal support beams 504a and 504b. Similarly, secondary vertical supports 524a-524d may incorporate telescoping elements to vertically position the horizontal beam elements and associated structural supports 520a and 520b for matching pitch angle of the control arm and the suspension beam.

Vehicle cradle 508 provides attachment plates 530 for direct engagement of the wheel attachment bolts on the vehicle through holes 532. By removing the wheels and engaging the attachment plates the vehicle is directly supported by the cradle without modification to the vehicle. Additionally, the engagement by the cradle in this manner avoids any unintended structural stiffening of the vehicle which may occur with direct engagement of the cradle with structural elements of the vehicle body or frame. However, locking structure to secure the vehicle suspension is employed where required to assure that compliance of the suspension does not affect the input forces on the vehicle.

Figure 7A:
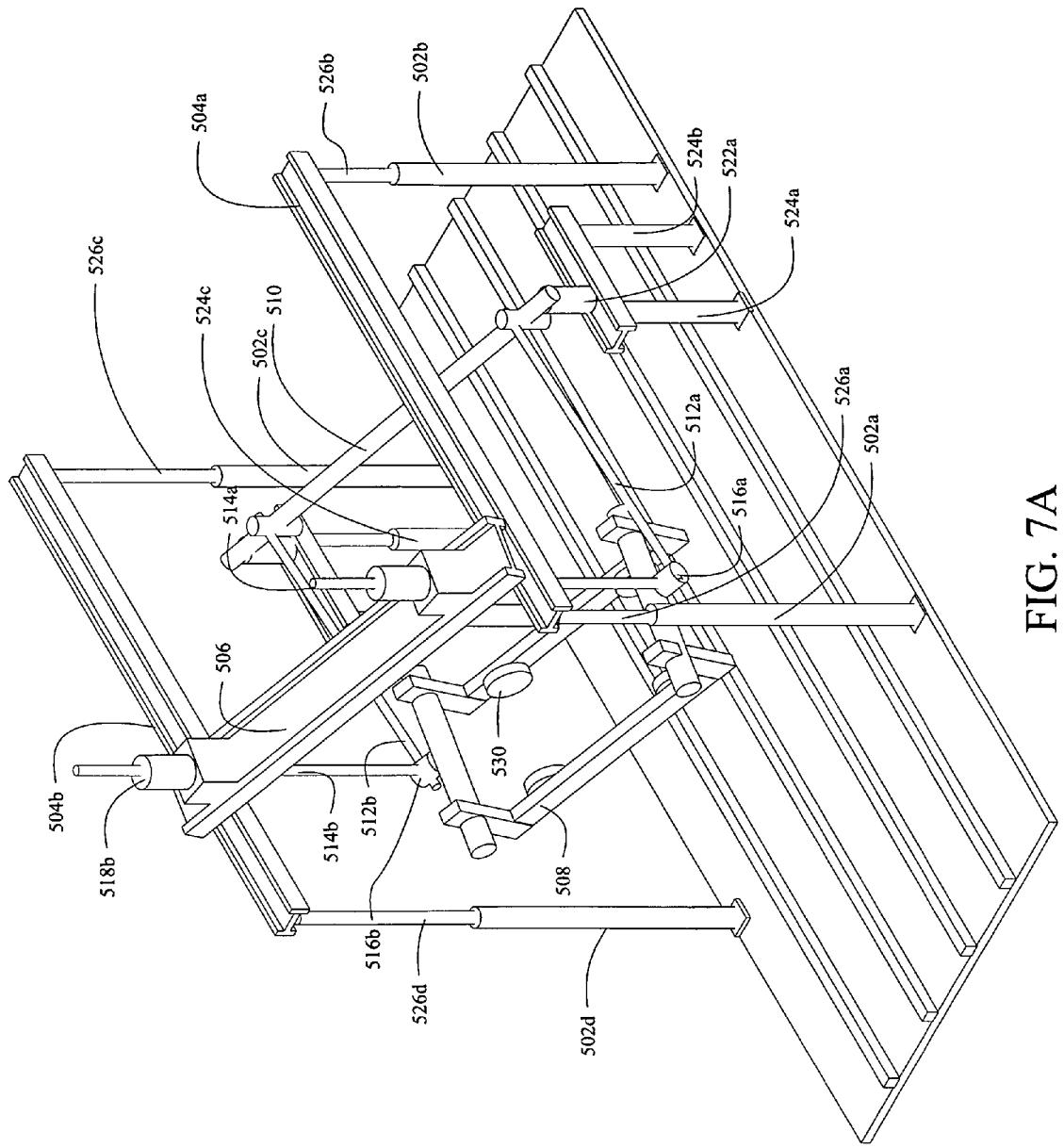
FIG. 7A is an isometric view structural details of an implementation of the alternative embodiment in a nose-down and yawed orientation.
Figure 7B:
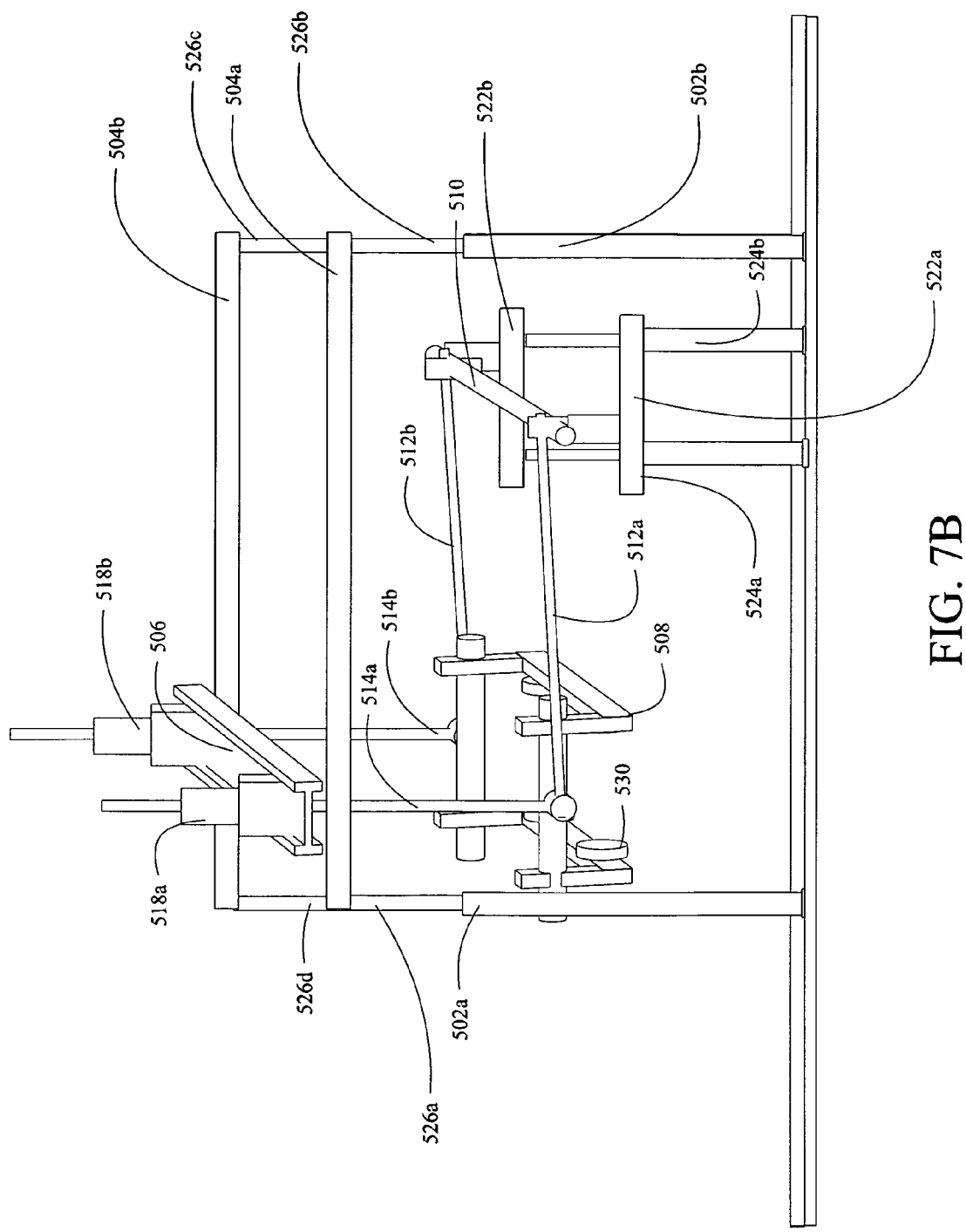
FIG. 7B is a side view of the structure of FIG. 7A.
Figure 7C:
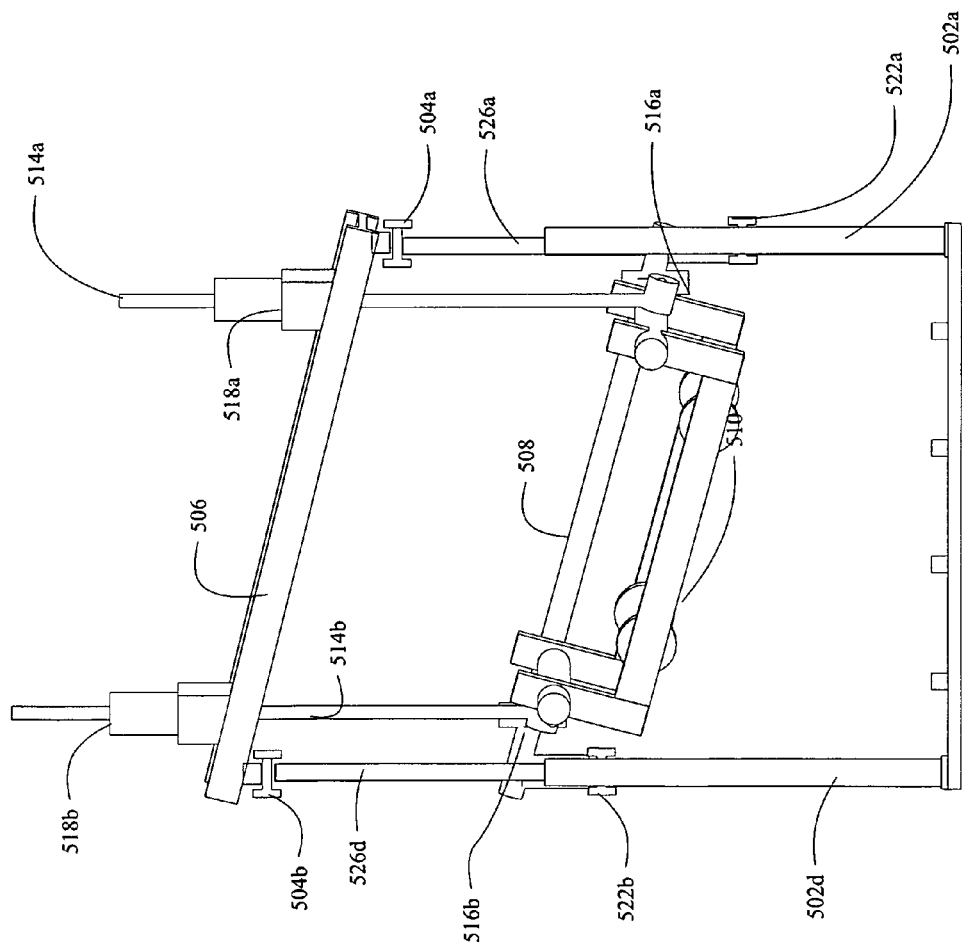
FIG. 7C is an end view of the structure of FIG. 7A.

FIGS. 7A-7C provide isometric, side and end views of the second embodiment with the pitch and yaw of the vehicle cradle modified from the orthogonal settings. In the views shown, the cradle is pitched tail down (as opposed to nose down as shown in FIG. 5) by extending the telescoping adjusting elements 526c and 526d to raise support beam 504b and lowering the telescoping adjusting elements 526a and 526b to lower support beam 504a. This support arrangement places suspension beam 506 at a first pitch angle relative to the plane of the sled for impact. Similarly, a yaw angle induced by sliding the ends of suspension beam 506 in opposite directions; forward along support beam 504a and rearward along support beam 504b. This places the cradle in a yawed position with respect to the directional axis of the sled. The control beam is similarly yawed by moving supports 520a and 520b along second horizontal support beams 522a and 522b. The angle of the control beam positions control arms 512a and 512b to maintain the yaw angle of the cradle during the drop in which slip rods 514a and 514b slide through actuation assemblies 518a and 518b.

Figure 8:
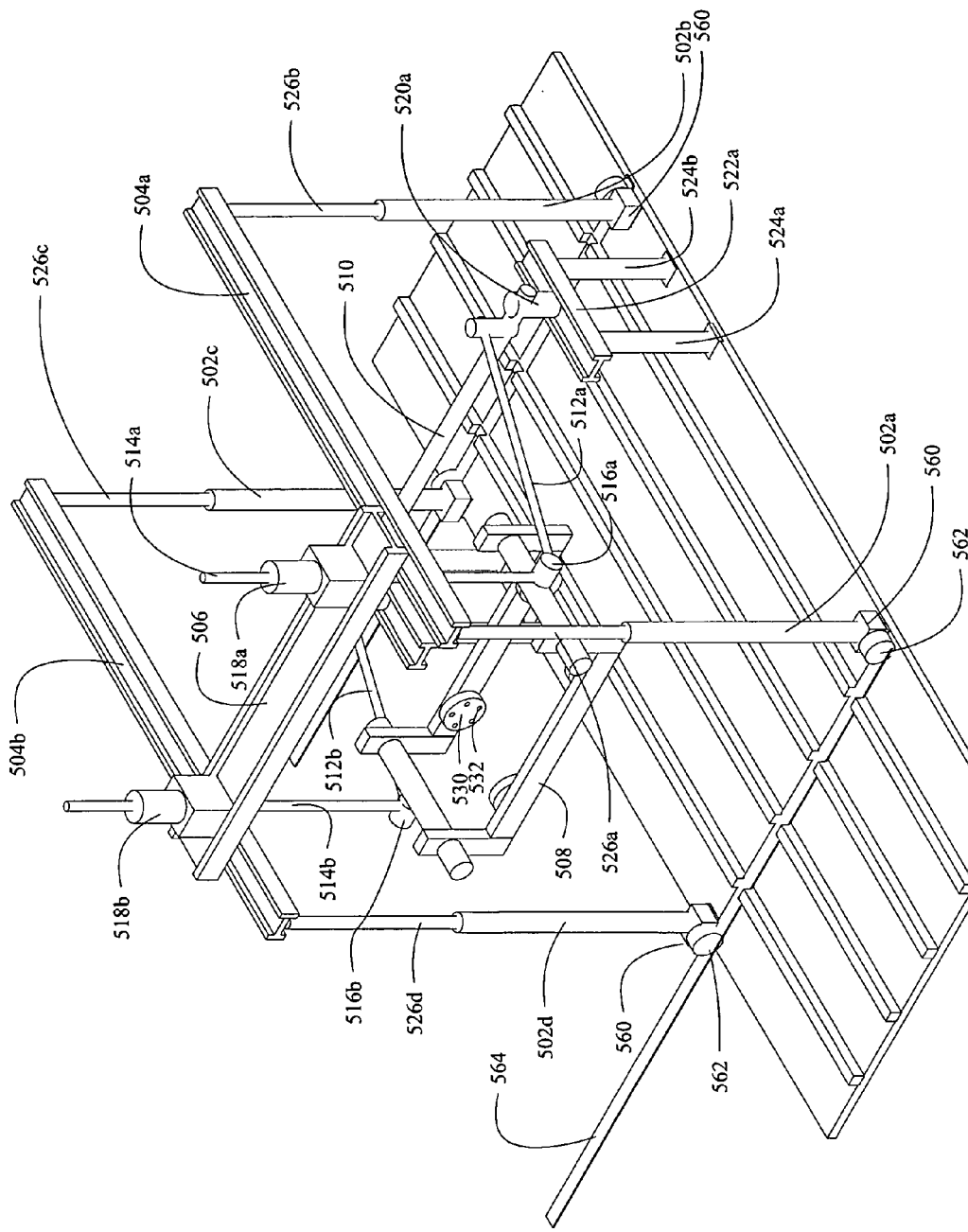
FIG. 8 is an isometric view of a gantry capability added to the embodiment of FIG. 6A.

FIG. 8 shows an additional feature of the present invention in which vertical supports 502a-502d each incorporate a support block 560 adjacent the foot of the support. A retractable wheel 562 is supported from the block to provide lateral motion of the entire cradle support assembly for lateral motion along tracks 564 as a gantry allowing loading of test vehicles into the cradle at a location separated from the sled track. This provides additional safety for personnel operating the system and simplifies pre and post test support.

For the embodiment shown in FIG. 5, the sled incorporates three separable structures center 10a, right wing 10b and left wing 10c. The sled may be operated with all three elements interconnected to obtain data for all potential contact points, i.e. the roof and support pillars, front hood/fender and rear contact. Operation of the center only allows data gathering with respect to the strength of the roof and support pillars only, for example, with the right and left wings not connected and therefore not providing any contact surface for the nose and tail of the test vehicle. Operation of the center with one or the other of the wings allows data gathering for the nose and tail structures.

Rotation of the cradle is imparted in the alternative embodiment using a gear motor or similar drive element as previously described mounted in one or both of the rotational support bosses. Alternatively, a motor driven drive pulley 546 engages a cable 548 which runs a rotational sleeve on the control beam to pulleys 550a and 550b at the attachment of the control arms to reaction pulleys 552a and 552b mounted on the rotational support bosses.

Alternatively, the cable provided for the pulley can be interconnected to the sled and pneumatic power provided for driving motion of the sled. Motion of the sled thereby imparts rotational motion to the cradle. By attachment of the cable to pulleys 552a and 552b using end beads captured in slots in the pulley wall, the cable is released from the pulley at the desired rotation providing free rotation of the cradle at the actual impact.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A test fixture for rollover crash testing of a test vehicle onto a moving surface said fixture comprising:
    a cradle to support and rotate a test vehicle;
    a structure to position and releasably hold the cradle;
    a sled having a contact surface and carried by bearings on a guide extending beneath the structure and the cradle;
    means for rotating the cradle;
    means for releasing the cradle and test vehicle from the structure responsive to a sensing means for contact within a drop impact zone on the contact surface of the sled; and
    means for arresting vertical motion of the cradle.

2. The apparatus of claim 1 further comprising means for detecting an event completion, the arresting means responsive to the detecting means, the test vehicle mounted in the cradle being isolated from additional impacts after a desired impact or impacts.

3. The apparatus of claim 1 wherein the means for rotating the cradle includes a gear motor.

4. The apparatus of claim 1 further comprising means for selectively setting pitch angle, yaw angle, roll angle, roll rate, and drop height for impact on the contact surface.

5. The apparatus of claim 1 further comprising ballast weights attachable to the cradle to set a weight of the test vehicle.

6. The apparatus of claim 1 further comprising ballast weights attachable to the cradle to set a roll moment of inertia of the test vehicle.

7. The apparatus of claim 1 wherein the sled is equipped with instrumentation to measure forces and accelerations imposed on the contact surface caused by impact from the dropping of the test vehicle.

8. The apparatus of claim 1 wherein the vehicle is equipped with impact instrumentation.

9. The apparatus of claim 1 wherein various types of materials may be attached to the contact surface to effect and simulate different roadway friction conditions.

10. The apparatus of claim 1 wherein various types of materials may be attached to the contact surface to effect and simulate different roadway obstacles and conditions.

11. The apparatus of claim 1 wherein the means for rotating the cradle further includes a set of coupling joints to allow angular and translational compliance between the gear motor and the test vehicle cradle.

12. The apparatus of claim 1 wherein the sled incorporates multiple elements for collective operation as a unit and individual operation for contacting specific surfaces of the vehicle.

13. The apparatus of claim 1 wherein the structure is laterally movable for displacement of the cradle from the guide for the sled.

14. A method for crash testing of a test vehicle or representation thereof onto a moving surface comprising the steps of:
    providing a structure to support and position a test vehicle component above a sled path;
    providing a sled on the path onto which the test vehicle is dropped in synchronous coordination with simulated roadway obstacles within an impact zone;
    rotating the support structure to establish a predetermined angular momentum and position the test vehicle for impact onto the impact zone on the sled;
    triggering the drop of the test vehicle at a specific time with respect to an angular position of the test vehicle; and,
    isolating the test vehicle from additional impacts after the desired impact or impacts.

15. The method of claim 14 wherein the motive power in the step of rotating the support structure is provided by a gear motor.

16. The method of claim 14 further comprising the step of selectively setting positional parameters of the test vehicle including pitch angle, yaw angle, roll angle, roll rate, drop height and position of impact on the contact surface.

17. The method of claim 14 further comprising the step of setting strength to weight ratio of the test vehicle by means of adjusting ballast weights to the vehicle support cradle or test vehicle.

18. The method of claim 14 further comprising the step of setting moments of inertia of the test vehicle by means of adjusting ballast weights to the vehicle support cradle or to the test vehicle.

19. The method of claim 14 wherein the contact surface is equipped with instrumentation and further comprising the step of measuring forces and accelerations imposed on the contact surface caused by impact with the test vehicle.

20. The method of claim 14 wherein the vehicle is equipped with impact instrumentation.

21. The method of claim 14 wherein the step of providing a sled includes attaching various types materials to the contact surface to effect and simulate different roadway surface friction conditions.

22. The method of claim 14 wherein the step of providing a sled includes attaching various types of materials to the contact surface to effect and simulate different roadway obstacles and conditions.

23. The method of claim 14 wherein the step of providing a sled includes providing separable sled elements for contacting only desired structural elements on the vehicle.

24. The method of claim 14 wherein the step of providing a support structure further comprising the steps of mounting wheels to the support structure and laterally moving the support structure from the sled path for loading a test vehicle into the structure.

25. The method of claim 14 wherein the step of providing a sled further includes the step of providing pneumatic power for motion of the sled along the path and the step of rotating the support structure comprises the steps of interconnecting a cable from the sled to pulleys for rotating the support structure coincident with motion of the sled.

* * * * *